(12) United States Patent
Sotgiu

(10) Patent No.: US 7,784,519 B2
(45) Date of Patent: Aug. 31, 2010

(54) TYRE FITTING MACHINE

(75) Inventor: Paolo Sotgiu, Modena (IT)

(73) Assignee: Snap-On Equipment Srl a Unico Socio, Correggio (IT)

(*) Notice: Subject to any disclaimer, the term of this patent is extended or adjusted under 35 U.S.C. 154(b) by 33 days.

(21) Appl. No.: 12/325,564

(22) Filed: Dec. 1, 2008

(65) Prior Publication Data
US 2009/0173453 A1   Jul. 9, 2009

(30) Foreign Application Priority Data
Nov. 29, 2007   (DE) .................. 10 2007 057 484

(51) Int. Cl.
*B60C 25/135* (2006.01)
(52) U.S. Cl. ..................... 157/21; 157/1.17
(58) Field of Classification Search ............ 157/21, 157/1.24, 14, 1.1, 1.17, 1.2, 1.22, 1.26, 1.28
See application file for complete search history.

(56) References Cited

U.S. PATENT DOCUMENTS

| | | | |
|---|---|---|---|
| 3,853,165 A | 12/1974 | Collmann | |
| 4,763,710 A * | 8/1988 | Pielach | 157/14 |
| 5,490,552 A | 2/1996 | Vignoli | |
| 6,145,566 A * | 11/2000 | Kliskey | 157/1.17 |
| 6,516,855 B2 * | 2/2003 | Corghi | 157/14 |
| 6,527,032 B2 * | 3/2003 | Corghi | 157/1.28 |
| 7,010,975 B2 * | 3/2006 | Oppermann et al. | 73/487 |
| 7,201,204 B2 * | 4/2007 | Corghi et al. | 157/16 |

FOREIGN PATENT DOCUMENTS

| | | |
|---|---|---|
| DE | 36 14738 A1 | 11/1987 |
| EP | 0 644 071 A1 | 3/1995 |
| EP | 1 844 960 A1 | 10/2007 |
| FR | 2 804 908 | 8/2001 |

OTHER PUBLICATIONS

"TCX550—Automatic Swing-Arm Tire Changer with Bead Press System," Hunter Engineering Company Product Literature, Form 5321T, Jul. 2005 (8 pages).
"TCX550BPS Tire Changer," Hunter Engineering Company Product Literature, Form 5293T, Jul. 2005, (38 pages).
Hunter Engineering Co. Product Demonstration Compact Disc, No. 5309T, containing TCX550BPS Demonstration video and Operations video, Ver. Nov. 2004, copyright 2005.
"Superautomatic Tyre Changer," Form No. 3900221 for "S 436 Instruction Manual", SICE Automotive Equipment, Feb. 2005 (50 pages).
SICE Automotive Equipment Product Literature, "S436 Superautomatic Tyre Changer," received May 23, 2002 (4 pages).
SICE Automotive Equipment Product Literature, "Pneurama—Semplicemente Completo," dated Sep./Oct. 2004 (2 pages).

* cited by examiner

*Primary Examiner*—David B Thomas
(74) *Attorney, Agent, or Firm*—McDermott Will & Emery LLP

(57) ABSTRACT

A tire fitting machine having a wheel mounting means 1 which is mounted rotatably about a vertical axis 5 and to which a wheel rim 6 is to be fixed when fitting or removing a tire, wherein the wheel rim 6 rests on a support surface 2 of the wheel mounting means 1, the support surface extending perpendicularly to the axis 6, wherein the support surface 2 is displaceable along the axis 5 and is fixable in a plurality of positions.

14 Claims, 4 Drawing Sheets

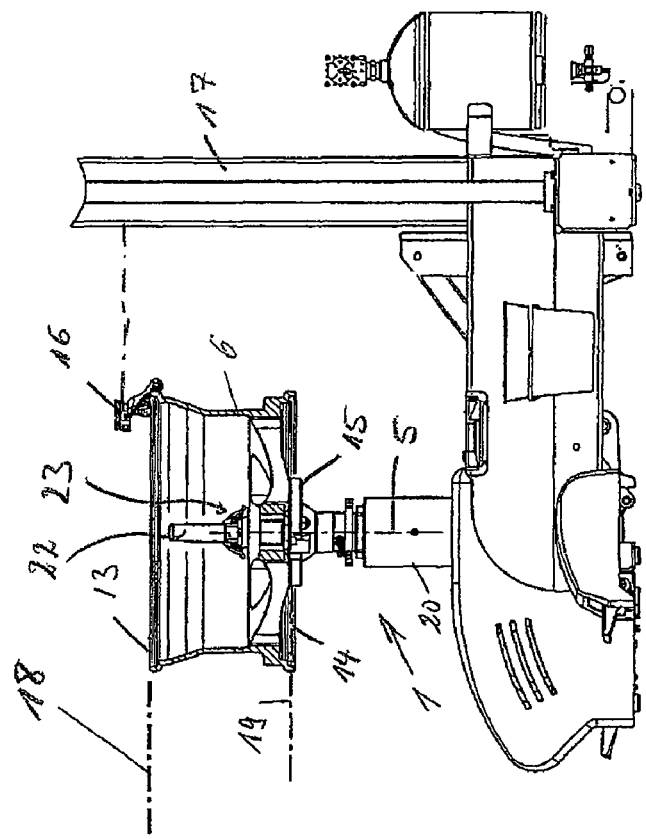
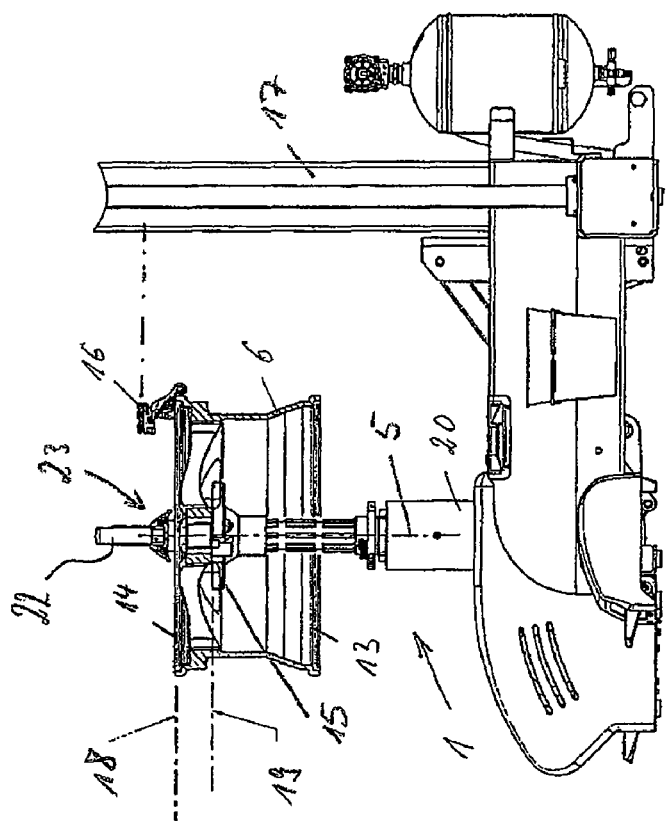

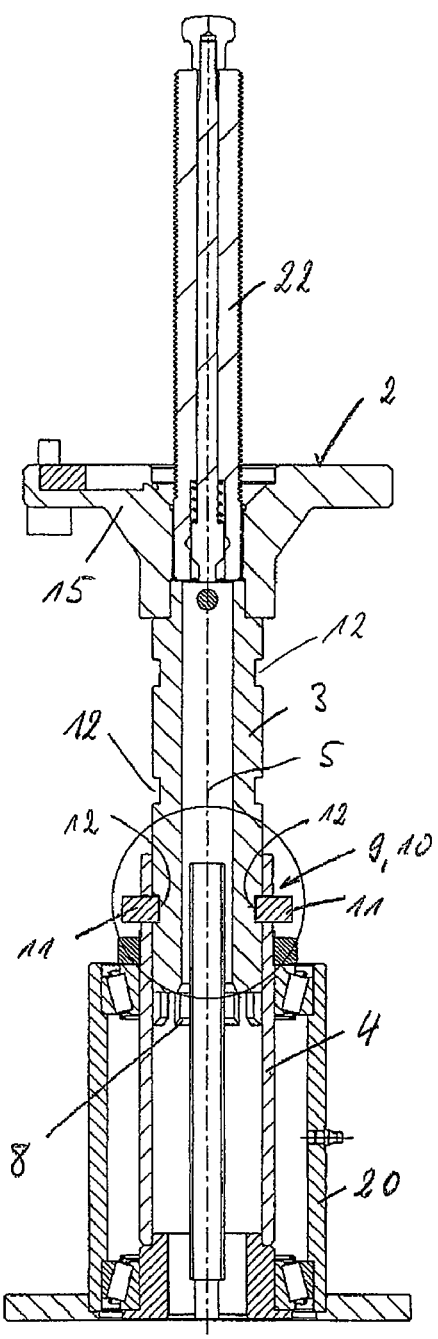
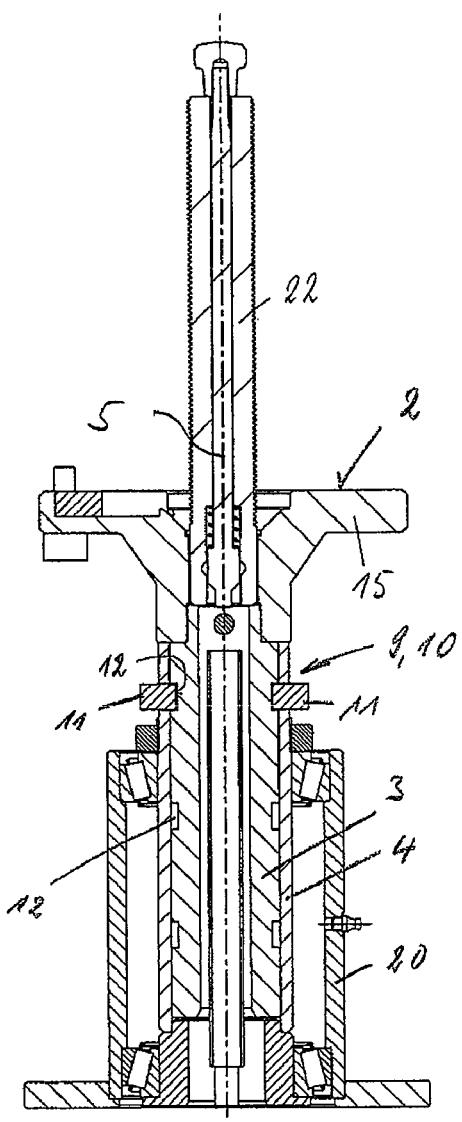

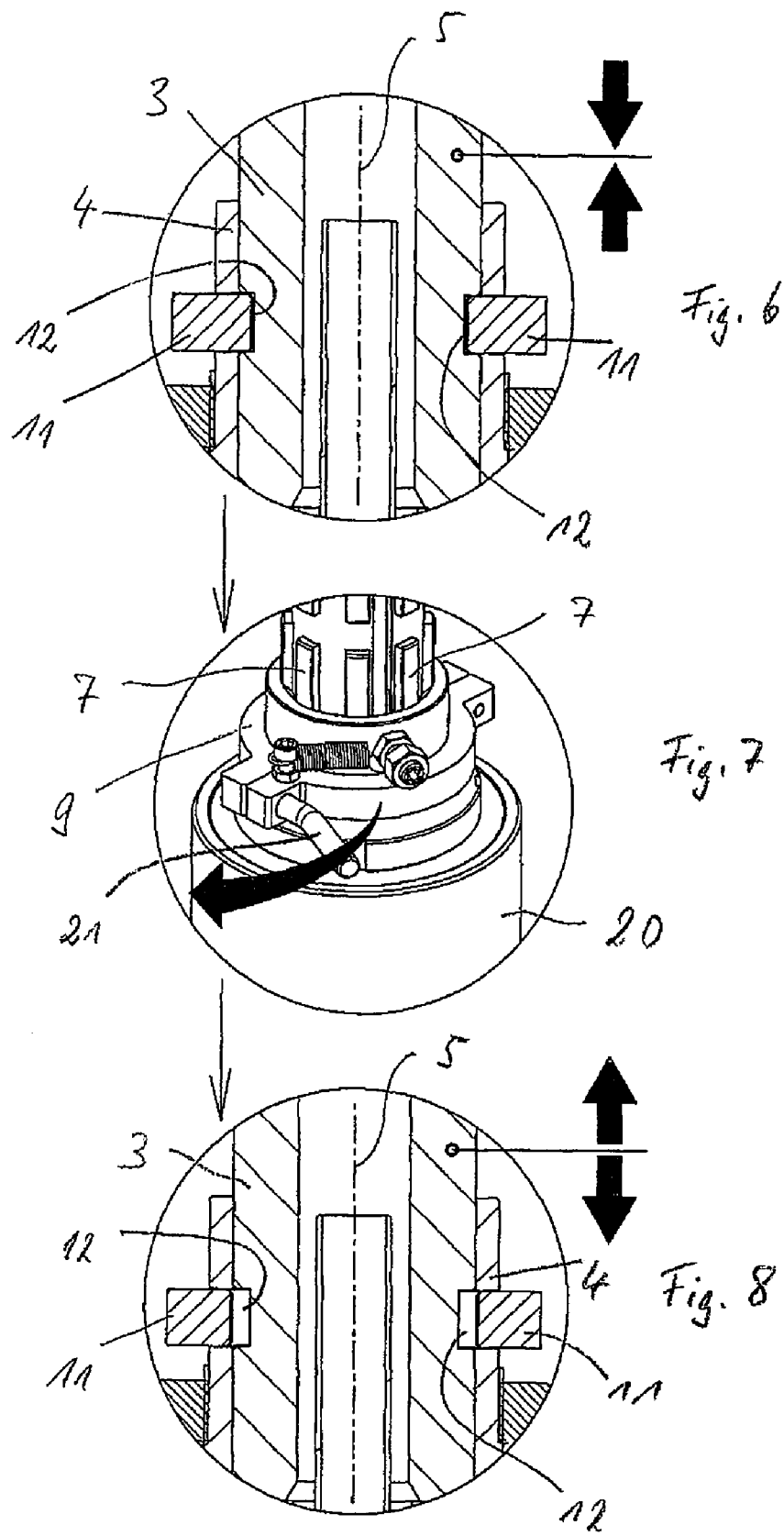

US 7,784,519 B2

TYRE FITTING MACHINE

TECHNICAL FIELD

The invention concerns a tyre fitting machine having a wheel mounting means which is mounted rotatably about a vertical axis and to which a wheel rim is to be fixed when fitting or removing a tyre, wherein the wheel rim rests on a support surface of the wheel mounting means, the support surface extending perpendicularly to the axis.

BACKGROUND

A tyre fitting machine of that kind is known for example from U.S. Pat. No. 7,108,036 B2. Certain operations in the tyre fitting and tyre removal procedures are preferably carried out on the tyre bead and the rim flange, when they are disposed upwardly. For that purpose it is necessary for the rim or the wheel to be turned so that the initially downwardly disposed rim flange and the downwardly disposed tyre bead are arranged facing upwardly. In the case of tyre fitting machines in which there is only one fitting-removal tool which acts on the upper tyre bead from above, it is also necessary to turn the wheel or the rim, as is known for example from U.S. Pat. No. 3,050,096.

In the majority of rim types which occur in practice the rim dish with which the wheel rests on the support surface of the wheel mounting means is disposed outside the central plane of the wheel. That therefore involves different processing planes during the fitting or removal operation, not only when turning the wheel but also by virtue of the different axial positions of the rim dish with respect to the rim flanges with the different types of wheel. The result of this is that the pillar on which the fitting-removal tool is guided and supported in a vertical direction must be of a minimum height in order to be able to deal with all types of wheel and all types of rim on the fitting machine.

The problem of the invention is to provide a tyre fitting machine of the kind set forth in the opening part of this specification, which provides for a reduced structural height, in particular of the pillar on which the at least one fitting-removal tool is vertically displaceably mounted and supported.

SUMMARY OF THE DISCLOSURE

With the invention the support surface on which the wheel rim rests in the fitting operation or the removal operation is displaceable along the axis of the wheel mounting means and is fixable in a plurality of positions.

That provides that, when dealing with different types of wheel, the respective upwardly disposed working plane which is defined by the upwardly disposed tyre bead and the upwardly disposed rim flange is in the same horizontal plane in each case or only a minor deviation of the respective heightwise position of the working planes from each other is achieved. That provides that in particular the upwardly disposed fitting-removal tool can remain in the same working plane or has to be moved only slightly in a vertical direction in order to provide for adaptation to the respective working plane when changing the wheel types. That results in a reduction in the minimum height of the pillar on which the fitting-removal tool is supported when changing a tyre. In addition that provides for a reduction in the force moments which emanate from the pillar and which are to be carried by the machine frame. It is thus possible with the present invention for the height setting of the support surface on which the rim dish comes to lie to be positioned at different heights. With different types of rim or wheel, that means that the upwardly disposed fitting-removal tool can be positioned at a heightwise position which remains substantially the same. The resulting optimisation of the structural height of the tyre fitting machine and the adaptation thereof to different wheel types means that the entire machine structure can be made more torsionally stiff. That provides that the forces are carried in a better fashion and, by virtue of the shorter length of the fitting-removal tools, the arrangement also affords a reduction in the risk of damage to the rims in the fitting and removal operation. By virtue of the reduced length of the tools they can be more exactly guided on the machine.

The support surface on which the wheel rim rests when fitting or removing the tyre can be fixed to one of two shaft portions which are displaceable relative to each other along the axis and which can be non-rotatably connected to each other in a plurality of latching positions and which are mounted rotatably about the axis. The respective spacings of the latching positions from each other can be adapted to the different axial spacings of the rim dishes from the rim flanges in the various types of rim. They can also be of such a dimension that the two rim flanges of the wheel rim prior to and after the step of turning the wheel rim through 180°, with respect to a diameter line passing through the centre of the wheel, are arranged in the same working plane which is perpendicular to the axis of the wheel mounting means, or in two working planes which differ only slightly from each other in their axial positions, after the shaft portions are displaced relative to each other by the spacing of the latching positions.

The two shaft portions are preferably fitted telescopically one into each other and can have interengaging axially extending ribs for a non-rotatable connection about the common axis.

One of the two shaft portions is preferably rotatably mounted axially non-displaceably in the wheel mounting means. A latching device can be provided on that shaft portion, which can be brought into engagement with latching elements which are provided on the other displaceably mounted shaft portion and which determine the respective latching positions. The contact surface for the rim flange is preferably disposed on the displaceably mounted shaft portion. It is possible to provide two or more latching positions along the axis of the wheel mounting means. That makes it possible to achieve working planes at the same or only slightly mutually different heightwise positions for different types of rim and possibly when turning the wheel.

BRIEF DESCRIPTION OF DRAWINGS

The invention will be described in greater detail by means of an embodiment with reference to the Figures in which:

FIG. 1 shows a side view of a tyre fitting machine which is an embodiment of the invention, a wheel rim being mounted in a first position in the wheel mounting means, FIG. 2 shows the tyre fitting machine illustrated in FIG. 1, in which the rim which has been turned through 180° about a diameter line passing through the centre of the rim is resting on the support surface which has been lowered in relation to FIG. 1, FIG. 4 shows a view in section of a wheel mounting means of the embodiment of FIGS. 1 and 2 with the lifted support surface corresponding to FIG. 1, FIG. 5 shows the wheel mounting means of the embodiment of FIGS. 1 and 2 with the support surface lowered as shown in FIG. 2, FIG. 6 is a view on an enlarged scale showing parts of the latching device in the latched condition, FIG. 7 shows a perspective view of the latching device, and FIG. 8 shows the parts of the latching device, which are shown in FIG. 6, in their released position.

DETAILED DESCRIPTION

Figure 3:
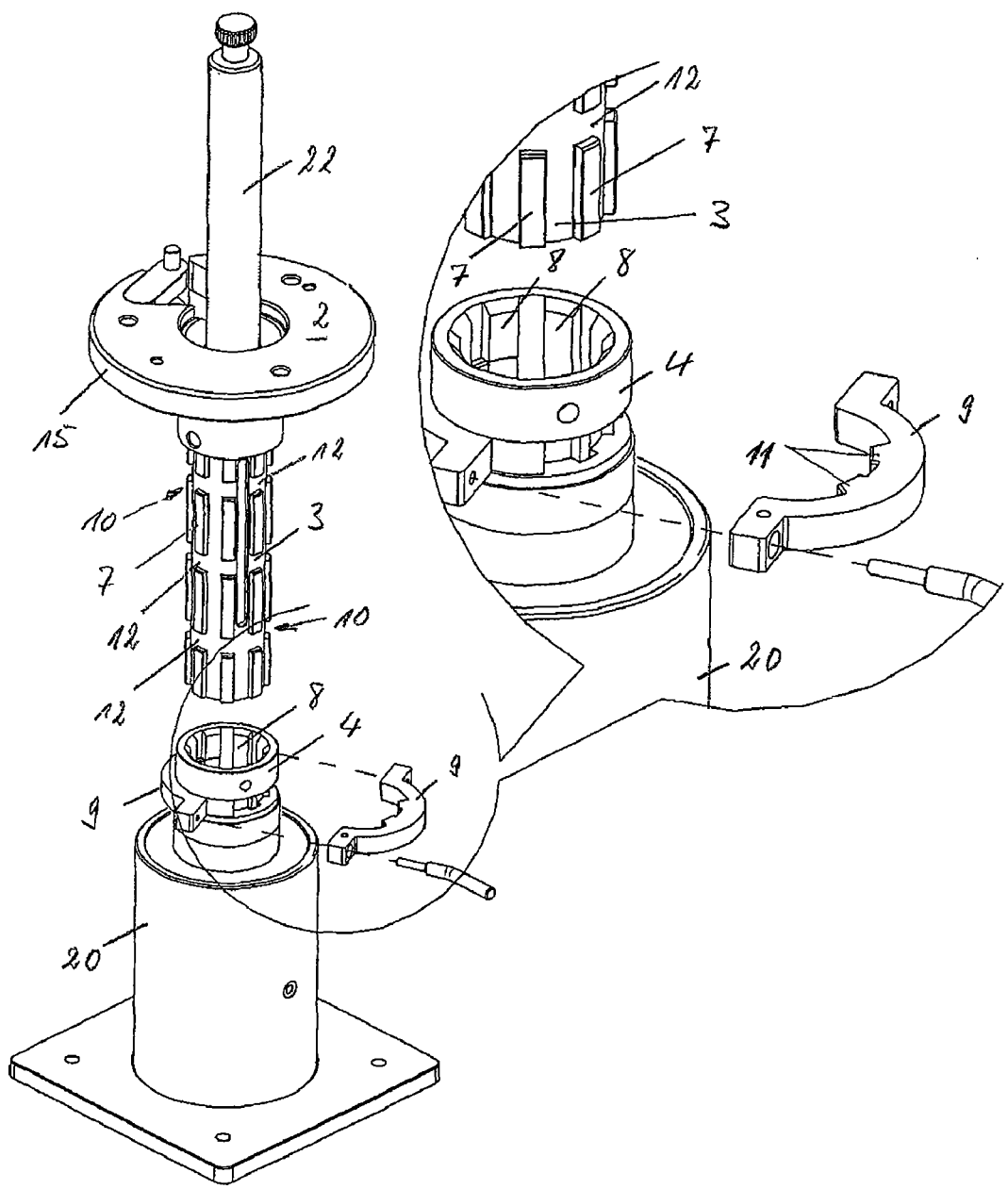
FIG. 3 shows an exploded view illustrating components of the wheel mounting means of the embodiment of FIGS. 1 and 2 with a detailed view of a latching device for fixing the support surface at various heightwise positions.

The tyre fitting machine shown in FIGS. 1 and 2 for fitting/removing a tyre to/from a wheel rim 6 includes a wheel mounting means 1 mounted rotatably about an axis 5. The wheel rim 6 is mounted non-rotatably in the wheel mounting means 1 by means of a clamping device 23 having a centering and clamping rod 22 which is passed through a central hole in the wheel rim 6. For that purpose, in the region of its rim dish, the wheel rim is pressed by the clamping device 23 on to a support surface 2 of the wheel mounting means 1. When the wheel mounting means is rotated about the axis 5 the wheel rim 6 is also rotated. A rotary drive for the wheel mounting means 5 is provided beneath the wheel mounting means 1 in the machine housing and is not shown in greater detail in the Figures.

The procedure for fitting or removing the tyre (not shown in greater detail) is carried out by means of at least one fitting or removal tool 16 which is diagrammatically shown in FIGS. 1 and 2. The fitting/removal tool 16 is mounted displaceably in a vertical direction on a pillar 17 of the tyre fitting machine. The forces which act in the fitting or removal operation are carried and supported on the machine frame, by way of the pillar 17. Only the upwardly disposed fitting/removal tool 16 is diagrammatically shown in FIGS. 1 and 2. The fitting machine can also have a fitting/removal tool which is associated with the lower working plane, that is to say the downwardly disposed rim flange and the downwardly disposed tyre bead, in known manner.

As can be seen from FIGS. 1 and 2 there is provided a support plane 19 which is defined in the support surface 2 and which extends perpendicularly to the vertical axis 5 of the wheel mounting means 1. In FIG. 1 the wheel rim 6 is in such a position that a rim flange 14 is disposed upwardly and together with a tyre bead (not shown) forms an operating plane 18 in which or in the area surrounding which the fitting/removal tool 16 comes into operation.

As the rim dish which rests on the support surface 2 in the support plane 18 is disposed outside the central plane of the wheel rim 6, displacement of the working plane 18 upwardly takes place in known tyre fitting machines when dealing with successive different types of rim and possibly when turning the wheel flange 6, when the initially downwardly disposed rim flange 13 is disposed upwardly. That requires corresponding heightwise displacement of the fitting/removal tool 16 upwardly.

In order to avoid that the invention provides that the support surface 2 is mounted in the wheel mounting means 1 displaceably along the axis 5 so that, when the wheel rim 6 is turned, the support surface 2 can be moved into a lower position and fixed there. That lower position of the support plane 19 and the support surface 2 is shown in FIG. 2. It will be clear therefrom that the initially downwardly disposed rim flange 13 which is now disposed upwardly is in the same working plane 18 as in the operating condition shown in FIG. 1.

In the illustrated embodiment the wheel mounting means has a shaft formed from two shaft portions 3 and 4. The shaft portions 3 and 4 are fitted telescopically into each other. For non-rotatably connecting the two shaft portions together, the outer hollow shaft portion 4 has axially extending ribs 8 at its inside peripheral surface. Those ribs 8 are in engagement with ribs 7 which also extend axially at the outside surface of the inner shaft portion 3. The outer shaft portion 4 is mounted rotatably in a bearing housing 20 and can be driven by the drive device (not shown). The inner shaft portion 3 which is also of a hollow-cylindrical configuration is fitted into the outer shaft portion 4. The two shaft portions are non-rotatably connected together by the axially extending ribs 7 and 8 on the two shaft portions 3 and 4 engaging into each other.

A wheel support plate 15 is fixed to the upper end of the inwardly disposed shaft portion 3. That wheel support plate 15 has the support surface 2 which, as already described above, forms the support plane 19. For fixing the wheel support plate 15 in different vertical positions, the ribs 7 at the outer periphery of the shaft portion 3 are interrupted by recesses 12. Those recesses 12 which are at given axial spacings from each other form arresting elements 10 for determining latching positions for specific heightwise settings in which the support surface 2 can be fixed along the axis 5. For that purpose projections 11 which are provided on an arresting element 9 can come into engagement. The arresting element 10 in the illustrated embodiment comprises two semicircular ring portions 9. Disposed at the inside periphery of those semicircular ring portions are the projections 11 which are directed radially towards the axis 5 when the ring portions which are supported on the outer shaft portion 4 are fitted together. The recesses 12 which are respectively disposed on a circular periphery at the outside surface of the shaft portion 3 form the arresting elements 10 on the inwardly disposed shaft 3, in the given axial position. Arresting elements 10 of that kind are provided on the shaft portion 3 at three different axial positions. FIG. 4 shows that the arresting element 9 comes into engagement with its projections 11 into the lowermost arresting element 10 of the shaft 3. That provides the highest possible positioning of the support surface 2, as illustrated in FIG. 1. In FIG. 5 the projections 11 of the arresting element 9 are in engagement with the arresting element 10 which assumes the uppermost position on the inner shaft portion 3. That provides the lowest possible heightwise setting of the support surface 2. That corresponds to the operating position shown in FIG. 2.

When dealing with another type of rim or when the wheel is turned over, a change can be effected between the central arresting element 10 and the uppermost or lowermost arresting element on the shaft portion 3 so that, when dealing with another type of rim also, as shown in particular in FIGS. 1 and 2, when turning the wheel rim or the wheel or when making a change between different successive rim types, the respective upwardly disposed rim flange is arranged substantially in the same working plane 18.

FIG. 6 shows a view on an enlarged scale illustrating the latched condition of the latching device formed by the latching elements 9 and 10. In this operating position the support surface 2 is disposed in a given heightwise position and is fixed in that position. For the working steps to be carried out on the wheel, the two shaft portions 3 and 4 which, as already described above, are non-rotatably connected together by way of the ribs 7 and 8, can be rotated about the axis 5. To release the arresting action, an arresting lever 21 can be pivoted, as shown in FIG. 7, in order to release the two semicircular ring portions from each other. In the released condition, as shown in FIG. 8, the projections 11 on the semicircular arresting elements 9 are removed from the recesses 12. The shaft portion 3 can then be displaced in the axial direction with respect to the shaft portion 4.

The axial spacings of the arresting elements which are provided on the inner shaft portion 3 and which are formed by the recesses 12 disposed on respective circular peripheries, can be adapted to given types of rim. Preferably there are three arresting elements 10 on the inner shaft portion 3, as is shown in the Figures. It is however also possible for only two arresting elements 10 or more than three arresting elements to be provided.

The wheel support plate 15 with the support surface 2 and the inner shaft portion 3 can form a structural unit which can be interchangeably fitted in the shaft portion 4 mounted rotatably in the bearing housing 20. That arrangement provides that structural units adapted to respective types of rim, for fitting and removing the tyre, can be fitted into the shaft portion 4.

LIST OF REFERENCES 1 wheel mounting means
2 support surface
3 inner shaft portion
4 outer shaft portion
5 axis
6 wheel rim
7 rib on the inwardly disposed shaft portion
8 rib on the outwardly disposed shaft portion
9 arresting element
10 arresting element
11 projections
12 recesses
13 rim flange
14 rim flange
15 wheel support plate
16 fitting/removal tool
17 pillar
18 working plane
19 support plane
20 bearing housing
21 arresting lever
22 centering and clamping rod
23 clamping device

The invention claimed is:

1. A tyre fitting machine having a wheel mounting means (1) which is mounted rotatably about a vertical axis (5) and to which a wheel rim (6) is to be fixed when fitting or removing a tyre, wherein the wheel rim (6) rests on a support surface (2) of the wheel mounting means (1), the support surface extending perpendicularly to the axis (5),
   wherein the support surface (2) is displaceable along the axis (5) and is fixable in a plurality of positions,
   wherein the support surface (2) is fixed to one of two shaft portions (3, 4) which are displaceable relative to each other along the axis (5), and
   the two shaft portions (3, 4) form an inner and an outer shaft portion which are telescopically fitted one into the other and which have axially extending ribs (7, 8) engaging into each other for providing a non-rotatable connection about the axis (5).

2. A tyre fitting machine according to claim 1 characterised in that the two shaft portions (3, 4) can be non-rotatably connected to each other in a plurality of latching positions and are mounted rotatably about the axis (5).

3. A tyre fitting machine according to claim 2 characterised in that the respective spacing of the latching positions from each other is predetermined such that the support surface (2) is fixable so that each of two rim flanges (13, 14) of the wheel rim (6) are arranged in the same upper working plane (18) extending perpendicularly to the axis (5) or in an operating plane (18) differing slightly in the axial positioning thereof, after the wheel rim (6) is turned through 180° with respect to a diameter line extending through the centre point of the rim and the shaft portions (3, 4) are displaced relative to each other by the spacing of the latching positions relative to each other.

4. A tyre fitting machine according claim 2 characterised in that at least one of the two shaft portions (3, 4) is in the form of a hollow shaft.

5. A tyre fitting machine according to claim 2 characterised in that the spacings of the latching positions are adapted to given rim types.

6. A tyre fitting machine according to claim 2 characterised in that the spacings of the latching positions are adapted to different rim types for positioning the respective upwardly disposed rim flange at a given height which does not exceed a predetermined maximum height.

7. A tyre fitting machine according to claim 1 characterised in that the outer shaft portion is the axially non-displaceable shaft portion (4).

8. A tyre fitting machine according to claim 1 characterised in that the latching positions are formed by arresting elements (9, 10) which are provided on the inner shaft portion (3) and the outer shaft portion (4) and which releasably engage into each other.

9. A tyre fitting machine according to claim 8 characterised in that the arresting element (10) on the outer shaft portion (4) has projections (11) which are directed radially towards the axis (5) and which can be brought into engagement in recesses (12) on the inner shaft portion (3).

10. A tyre fitting machine according to claim 9 characterised in that the recesses (12) are in the form of interruptions in the ribs (7) on the inner shaft portion (3).

11. A tyre fitting machine according to claim 9 characterised in that the spacings of the latching positions are determined by the axial spacings of the recesses (12) on the inner shaft portion (3).

12. A tyre fitting machine according to claim 1 characterised in that the support surface (2) is fixed to the inner shaft portion (3).

13. A tyre fitting machine according to claim 1 characterised in that the support surface (2) and the inner shaft portion (3) are component parts of a structural unit.

14. A tyre fitting machine according to claim 1 comprising a fitting/removal tool (16) which is movable into the region of a working plane (18) formed by an upwardly disposed tyre bead and an upwardly disposed rim flange (13, 14) of the wheel rim (6), and which is movable in a vertical direction on a pillar (17) extending parallel to the axis (5) and can be supported in different vertical positions.

* * * * *